(12) United States Patent
Rizk et al.

(10) Patent No.: US 7,960,647 B2
(45) Date of Patent: Jun. 14, 2011

(54) LIGHTNING PROTECTION DEVICE: WET/DRY FIELD SENSITIVE AIR TERMINAL

(76) Inventors: Farouk A. M. Rizk, Saint-Lambert (CA); Amr Rizk, Saint-Lambert (CA)

(*) Notice: Subject to any disclaimer, the term of this patent is extended or adjusted under 35 U.S.C. 154(b) by 160 days.

(21) Appl. No.: 12/377,754

(22) PCT Filed: Oct. 23, 2007

(86) PCT No.: PCT/CA2007/001876
§ 371 (c)(1),
(2), (4) Date: Feb. 17, 2009

(87) PCT Pub. No.: WO2008/049207
PCT Pub. Date: May 2, 2008

(65) Prior Publication Data
US 2010/0236808 A1    Sep. 23, 2010

Related U.S. Application Data

(60) Provisional application No. 60/853,774, filed on Oct. 24, 2006.

(51) Int. Cl.
*H02G 13/00* (2006.01)
(52) U.S. Cl. ............. 174/3; 174/2; 174/4; 174/5 R; 174/6; 174/7; 361/220
(58) Field of Classification Search ............ 174/2, 3, 174/4 R, 5 R, 6, 7; 361/220, 117
See application file for complete search history.

(56) References Cited

U.S. PATENT DOCUMENTS

| | | | |
|---|---|---|---|
| 3,609,218 A | 9/1971 | Herb et al. | |
| 3,825,671 A | 7/1974 | Pokorny | |
| 3,930,113 A | 12/1975 | Johansen et al. | |
| 4,180,698 A | 12/1979 | Carpenter, Jr. | |
| 4,458,107 A | 7/1984 | Héroux | |
| 4,605,814 A | 8/1986 | Gillem | |
| 4,679,114 A | 7/1987 | Carpenter, Jr. | |
| 4,910,636 A | 3/1990 | Sadler | |
| 5,043,527 A | 8/1991 | Carpenter, Jr. | |
| 5,073,678 A | 12/1991 | Carpenter, Jr. | |

(Continued)

FOREIGN PATENT DOCUMENTS

CA        1205514        6/1986

(Continued)

OTHER PUBLICATIONS

Farouk A.M. Rizk, Modeling of Lightning Incidence to Tall Structure Part I: IEEE Trans. on Power Delivery, Canada, Jan. 1994, vol. 9, No. 1, pp. 162-171.

(Continued)

*Primary Examiner* — Dhiru R Patel
(74) *Attorney, Agent, or Firm* — Goudreau Gage Dubuc; Gonzalo Lavin

(57) ABSTRACT

A lightning protection device having a grounded Franklin rod and a conductive device attached to the rod and defining a predetermined overall shape of a predetermined size therearound. The lightning protection device is particularly devised to limit the amount of corona discharges under the ambient ground fields associated with lightning storms while the upward leader inception requirements remain unchanged during the descent of a lightning leader. The lightning protection device has a corona inception voltage that is substantially insensitive to contamination from pollution, insects, vermin or water droplets.

5 Claims, 3 Drawing Sheets

U.S. PATENT DOCUMENTS

| | | | |
|---|---|---|---|
| 5,932,838 | A | 8/1999 | Carpenter, Jr. |
| 6,017,628 | A | 1/2000 | Stevens et al. |
| 6,069,314 | A | 5/2000 | Varela |
| 6,307,149 | B1 | 10/2001 | Zini et al. |
| 6,320,119 | B1 | 11/2001 | Gumley |
| 7,236,341 | B1 | 6/2007 | Carpenter |
| 7,468,879 | B2 * | 12/2008 | Rizk et al. ............... 361/220 |
| 2003/0067731 | A1 | 4/2003 | Kent |
| 2003/0103311 | A1 | 6/2003 | Zhuang |
| 2004/0130842 | A1 | 7/2004 | Johansen |
| 2004/0251700 | A1 | 12/2004 | Hesse |
| 2005/0146832 | A1 | 7/2005 | D'Alessandro |
| 2007/0115607 | A1 | 5/2007 | Rizk et al. |
| 2007/0217113 | A1 | 9/2007 | Rizk et al. |

FOREIGN PATENT DOCUMENTS

| | | |
|---|---|---|
| CA | 2543551 | 6/2005 |
| EP | 0488695 | 6/1992 |

OTHER PUBLICATIONS

Farouk A.M. Rizk, Modeling of Lightning Incicdence to Tall Structure Part II: IEEE Trans. on Power Delivery, Canada, Jan. 1994, vol. 9, No. 1, pp. 172-193.

Farouk A.M. Rizk, A model for Switching Impulse Leader Inception and Breakdown of Long Air-Gaps: IEEE Trans. on Power Delivery, Canada, Jan. 1989, vol. 4, No. 1, pp. 596-606.

Farouk A.M. Rizk, Switching Impulse Strength of Air Insulation: Leader Inception Criterion: IEEE Trans. on Power Delivery, Canada, Oct. 1989, vol. 4, No. 4, pp. 2187-2195.

Farouk A.M. Rizk, Influence of Rain on Switching Impulse Sparkover Voltage of Large Electrode Air-Gaps: IEEE Trans. on Power Apparatus and Systems, Canada,Jul./Aug. 1976, vol. PAS-95, No. 4, pp. 1394-1402.

Farouk A.M. Rizk, Modeling of Transmission Line Exposure to Direct Lightning Strokes: IEEE Trans. on Power Delivery, Canada, Oct. 1990, vol. 5, pp. 1983-1997.

C.A.E. Uhlig, "The Ultra Corona discharge, A New Discharge Phenomenon Occuring on Thin Wires", Proceedings of High Voltage Symposium, National Research Council of Canada, Ottawa, 1956, paper No. 15.

C.A.E. Uhlig, "A.C. Corona Current and Loss on Thin Wires from Onset to Sparkover", Proceedings of High Voltage Symposium, National Research Council of Canada, Ottawa, 1956, paper No. 16.

V.I. Popkov, "Some Special Features of Corona on High-Voltage DC Transmission Lines", in GAS Discharges and the Electric Supply Industry, Proceedings of International Conference, CERL, Leatherhead, surry, England, May 1962, pp. 225-237.

N. G. Trinh, J.B. Jordan, "Modes of Corona Discharge in Air", IEEE Trans, May 1968, vol. PAS-87, No. 5, pp. 1207-1215.

P. Heroux. P.S. Maruvada, M.G. Trinh, "High voltage AC Transmission Lines: Reduction of Corona Under Foul Weather" IEEE Trans., Canada, Sep. 1982, vol. PAS-101, No. 9, pp. 3009-3017.

* cited by examiner

LIGHTNING PROTECTION DEVICE: WET/DRY FIELD SENSITIVE AIR TERMINAL

CROSS-REFERENCE TO RELATED APPLICATIONS

This application is a National Entry Application of PCT application no PCT/CA2007/001876 filed on Oct. 23, 2007 and published in English under PCT Article 21(2), which itself claims priority on U.S. provisional application Ser. No. 60/853,774, filed on Oct. 24, 2006. All documents above are incorporated herein in their entirety by reference.

FIELD OF THE INVENTION

The present invention generally relates to lightning protection, and more particularly concerns an improved lightning protection device.

BACKGROUND OF THE INVENTION

It is well known that most lightning discharges are associated with predominantly negatively charged clouds. Two main categories of lightning strikes are encountered: Upward flashes from very tall structures and the more prevalent strikes associated with negative descending stepped leaders, as explained in "Modeling of Lightning Incidence to Tall Structures Part I: Theory", Farouk A. M. Rizk, IEEE Trans. on Power Delivery, Vol. 9, No. 1 January. 1994, pp. 162-171, and also in "Modeling of Lightning Incidence to Tall Structures Part II: Application", Farouk A. M. Rizk, IEEE Trans. on Power Delivery, Vol. 9, No. 1 January. 1994, pp. 172-193. The negative descending leader is surrounded with a negative space charge sheath which, as the negative leader approaches the ground, induces positive (image) charges on any grounded object. The higher the grounded structure and the nearer it is to the path of the descending negative leader, the more significant the induced charge on the grounded structure.

It is known that a lightning stroke current is a statistical variable that varies in a wide range from a few kA to a few hundred kA with a median of 25-35 kA. The attractive radius of a structure i.e. the maximum radial distance around the structure in which a descending leader would be captured by the structure increases with both the stroke current, which is associated with the negative space charge jacket and the structure height.

In recent years, based on progress in research on the physics of breakdown of long air gaps, our understanding of the mechanisms by which different ground structures are hit by lightning have been substantially improved. In particular the role played by the grounded object in the strike mechanism has been clarified. As detailed in "Modeling of Transmission Line Exposure to Direct Lightning Strokes", Farouk A. M. Rizk, IEEE Trans. on Power Delivery, Vol. 5, October 1990, pp 1983-1997, modeling has shown that the attractive radius comprises two parts: a major part spanned by the positive leader emanating from the structure and the lesser part constituting the final jump between the negative and positive leader tips.

Electrostatic field analysis shows that the early stage electric field enhancement at the surface of and in the vicinity of any grounded structure is predominately caused by the positive charge that has been induced onto the grounded structure by the cloud charge and/or the descending negative leader and that this far exceeds the background field due to the cloud charge and/or the descending leader itself. Depending on the structural characteristics of the grounded object, an inception field caused by the induced charge is reached when ionization of the surrounding air takes place, causing corona discharge and positive streamer formation. Depending on the geometry of the grounded structure and the amount of induced positive charge, the length of the positive streamer can grow into the meter range.

As detailed in "A Model for Switching Impulse Leader Inception and Breakdown of Long Air-Gaps", Farouk A. M. Rizk, IEEE Trans. on Power Delivery, Vol. 4, No. 1, January 1989, pp. 596-606, and also in "Switching Impulse Strength of Air Insulation: Leader Inception Criterion", Farouk A. M Rizk, IEEE Trans. On power Delivery, Vol. 4. No. 4, October 1989, pp. 2187-2195, if the positive streamer reaches a critical size, a highly conducting stem is formed at the streamer junction to the structure and a positive leader is thereby formed. Contrary to the positive streamer which has a mean gradient of approximately 400-500 kV/m, the leader gradient is a function of both the leader current and the time duration of its existence. For a current of 1 A the leader gradient could be 30-50 kV/m i.e. approximately one tenth of the positive streamer gradient but for a leader current of the order of 100 A the leader gradient could go down to as low as 2-3 kV/m. This shows that contrary to the positive streamer, a positive leader is capable of traveling distances in the 100 m range without requiring unrealistically high electric potential.

It is important to note that not every positive leader emanating from a ground structure will complete the trajectory to encounter the descending negative leader in a final jump. As the positive leader travels farther and farther from the structure, its motion will be governed more and more by such parameters as space potential and the electric field ahead of the leader tip, which are determined more and more by the descending leader charge and less and less by the grounded structure. When conditions are not appropriate for continued propagation, the positive leader stops and the concerned grounded structure which started the positive streamer/positive leader process is not struck.

Objects that are struck by downward negative lightning are those which, due to their induced positive charge, "succeed" in creating long positive streamers resulting in the formation of a positive leader which progresses in a zone of increasing electric field in order to meet the approaching descending negative lightning leader in what is termed the final jump. The final jump takes place when the mean voltage gradient between the tip of the ascending positive leader and the tip of the descending negative lightning leader reaches 500-600 kV/m. Therefore if the objective is to maximize the probability of a strike to a lightning rod relative to the corresponding probability of the protected object, it will be of great advantage if conditions at the tip of the rod are ideal for creating of long positive ascending streamers/leaders.

BACKGROUND OF THE PRIOR ART

Lightning protection practices can be divided into two broad categories. The first being variations on the Franklin Rod or overhead ground wires whose purpose is to give a preferential path to ground for the current of a lightning stroke and thus prevent potential damage. For the most part, these systems do not claim to affect the probability of occurrence of a lightning strike.

It should be noted that the performance of a conventional lightning rod is influenced by its reaction to the ambient ground field which precedes the occurrence of a downward stepped leader. Such ambient ground fields are normally of the order of some 100V/m in fair weather conditions, but could, due to cloud charges preceding lightning, vary in the range 2 kV/m-20 kV/m, as explained by G. Simpson in "Atmospheric Electricity During Disturbed Weather", Geophysics Memoirs, Meteorological Office, London, No. 84, 1949, pp 1-51.

These electric fields which vary with time relatively slowly compared to subsequent field changes during leader descent, could last up to several minutes during a lightning storm, as mentioned by R. B. Anderson in "Measuring Techniques in Lightning", Vol 1, Chapter 13, Edited by R. H. Golde, 1977, p. 441. Between consecutive lightning discharges however the cloud-charge regeneration results in a slow ambient field duration of the order of 10 s. This is detailed by M. A. Uman and V. A. Rakov, in "A Critical Review of Nonconventional Approaches to Lightning Protection", American Meteorological Society, December 2002, pp 1809-1820. It is clear from the above that a lightning rod is generally exposed to a mixed type stress, with a slow varying component due to ambient ground field, followed by a much faster component due to the descending leader. A lightning rod which produces significant space charge due to the ambient ground field, would tend to self protect, as mentioned by C. B. Moore, G. D. Aulich, W. Rison in "Measurements of Lightning Rod Responses to Nearby Strikes", Geophysical Research Letters, Vol. 27, No. 10, May 15, 2000, pp 1487-1490, interfering with the desired streamer/leader formation in response to a descending stepped leader. This statement is substantiated by high voltage experiments on long air gaps under mixed voltages, as explained by N. Knudsen and F. Iliceto in "Flashover Tests on Large Air gaps with DC voltage and with Switching Surges Superimposed on DC Voltage", IEEE Trans., Vol. PAS-89, May/June 1970, pp 781-788.

In these experiments, corona space charge produced by a positive DC voltage stress preceding the application of a positive switching impulse led to an increase in the leader inception voltage and correspondingly an increase in the composite breakdown voltage of the long air gap, as mentioned in the latter mentioned reference.

Furthermore, as mentioned by G. Carrara and L. Thione in "Switching Surge Strength of Large Air Gaps: A Physical Approach", IEEE Transactions on Power Apparatus and Systems, Vol. PAS-95, No. 2, March/April 1976, pp 512-524, positive switching impulse breakdown tests on long air gaps and modeling of the associated phenomena have confirmed that for any gap length, the leader inception voltage is independent of the radius of curvature of the highly stressed electrode as long as it remains below a certain critical value. For an electrode radius below a certain critical value, corona inception voltage is lower than the leader inception voltage, so that corona discharge precedes leader formation. For a rod of radius equal to or greater than the critical value on the other hand, corona and leader inception voltages coincide.

In "Modeling of Transmission Line Exposure to Direct Lightning Strokes", Farouk A. M. Rizk, IEEE Trans. on Power Delivery, Vol. 5, October 1990, pp 1983-1997 and also in "A Model for Switching Impulse Leader Inception and Breakdown of Long Air-Gaps", Farouk A. M. Rizk, IEEE Trans. on Power Delivery, Vol. 4, No. 1, January 1989, pp. 596-606, a method is presented for formulating the dependence of the positive leader inception voltage on the air gap length (or lightning rod above the ground plane). That reference also provides a method for determining the value of the critical radius for any gap length or height of the lightning rod above the ground plane.

Another variation of the Franklin Rod is the Early Streamer Emitter systems, as described in French Standard NFC 17-102, "Protection of Structures and Open Areas against Lightning using Early Streamer Emission Terminals" July 1995 (English Translation). The idea here is that it is believed that if there were some means of initiating the streamer process earlier this would make a lightning rod more effective. Initiation of early streamers of adequate size even when it leads to the formation of an upward positive leader is no guarantee however for successful connection process. Shortly after the upward leader leaves the grounded structure its propagation will be governed by the ambient field conditions created by the descending stepped leader and not by the initial conditions at the grounded structure. An upward leader created too early will simply be aborted and will not lead to a successful connection process terminating by a final jump between the upward and descending leaders.

Another variation of the Franklin Rod described in U.S. Pat. No. 6,320,119 (Gumley) attempts to limit the amount of corona discharge through the use of a curved conducting surface having sufficient size to limit corona activity until the field to which the device is exposed is sufficient to trigger streamer/leader propagation. However, such an approach fails to consider the effects of contamination of such a curved conducting surface by vermin, insects and water droplets which are commonly associated with lightning. These contaminants will reduce the corona inception voltage of the large curved conducting surface to approach that of an ordinary lightning rod; so if such a device merely gets wet or contaminated it will produce corona at typical ambient ground fields which defeats the purpose of a surface with a large radius of curvature.

The other broad category of lightning protection practices can be called "the dissipation systems", such as described in U.S. Pat. No. 5,043,527 (Carpenter), U.S. Pat. No. 4,910,636 (Sadler et al.) and U.S. Pat. No. 4,605,814 (Gillem). These systems use points or end-tips of wires or rods to produce space charge. There have been several contradicting statements, with little or no scientific basis, on how these devices are supposed to work. Some dissipation system proponents claim that the production of space charge can neutralize the negative charge of the cloud and thereby eliminate lightning, which is an unrealistic task. Other dissipation systems proponents claim that the dissipation of ions from the protected structure will reduce the accumulated charge by blowing it downwind and reduce or minimize the potential difference between the charged cloud and the protected structure.

These claims are of course physically invalid since the induced (image) charges on a grounded structure are bound charges which remain in place so long as the inducing charges of the cloud or descending leader remain and cannot be dissipated into the surrounding air. Furthermore it is a well established scientific fact that metals do not emit positive ions. On the contrary positive space charge is formed by ionization processes that result in electrons being collected by the electrode (structure) and injected into the ground leaving the positive ion space charge behind in the surrounding air. Also changing the potential between the cloud and a grounded object necessarily means the unrealistic task of changing the potential of the cloud since by definition the grounded structure, unless struck by lightning, is and will always remain at ground potential.

Therefore, it would be desirable to provide an improved lightning protection device that would be more efficient than the known prior art devices.

STATEMENT OF THE OBJECT OF THE INVENTION

An object of the present invention concerns the control of corona inception and leader inception under different atmospheric conditions.

Accordingly, the objectives of the invention are:

To provide a lightning rod that limits the amount of corona discharges under the ambient ground fields associated with lightning storms while the upward leader inception requirements remain unchanged during the descent of a lightning leader.

To provide a lightning rod whose corona inception voltage is substantially insensitive to contamination from pollution, insects, vermin or water droplets.

SUMMARY OF THE INVENTION

According to the objectives of the present invention, there is provided a lightning protection device comprising:

a grounded Franklin rod; and a conductive device attached to the rod and defining a predetermined overall shape of a predetermined size therearound. The conductive device is shaped and sized so that, for a given position above ground where a continuous upward leader inception space potential is below a maximum ambient ground field space potential, a corona inception space potential of the protection device coincides with the continuous upward leader inception space potential, under both dry and wet conditions, while, for another given position above ground where the continuous leader inception space potential exceeds the maximum ambient ground field space potential, the corona inception space potential of the protection device is above the maximum ambient ground field space potential and below the continuous upward leader inception space potential, the corona inception space potential of the device being substantially insensitive to surface protrusions due to contamination.

In a preferred embodiment, the conductive device is provided with a plurality of metallic toroids, each being bonded to the Franklin rod in a spaced apart relationship. More preferably, each of the toroids has a predetermined major diameter and a predetermined minor diameter and is arranged with the others for defining the overall shape as a spherical or an ellipsoidal shape.

In a further preferred embodiment, for either a maximum space potential $U_{gm}=E_{gm}\cdot h$ for the maximum ambient field $E_{gm}$ and an effective height h of the Franklin rod above the ground, or a continuous positive leader inception potential $U_{lc}$ defined by:

$$U_{lc} = \frac{1556}{1+\frac{3.89}{h}},$$

(kV, m), the maximum electric field satisfies:

$$E_{ci}(r) = 2300\left[1 + \frac{0.224}{(2r)^{0.37}}\right],$$

(kV/m, m), where $E_{ci}$ is the corona inception field and r is a minor radius of the toroids.

The invention as well as its numerous advantages will be better understood by reading of the following non-restrictive description of preferred embodiments made in reference to the appended drawings.

Figure 1:
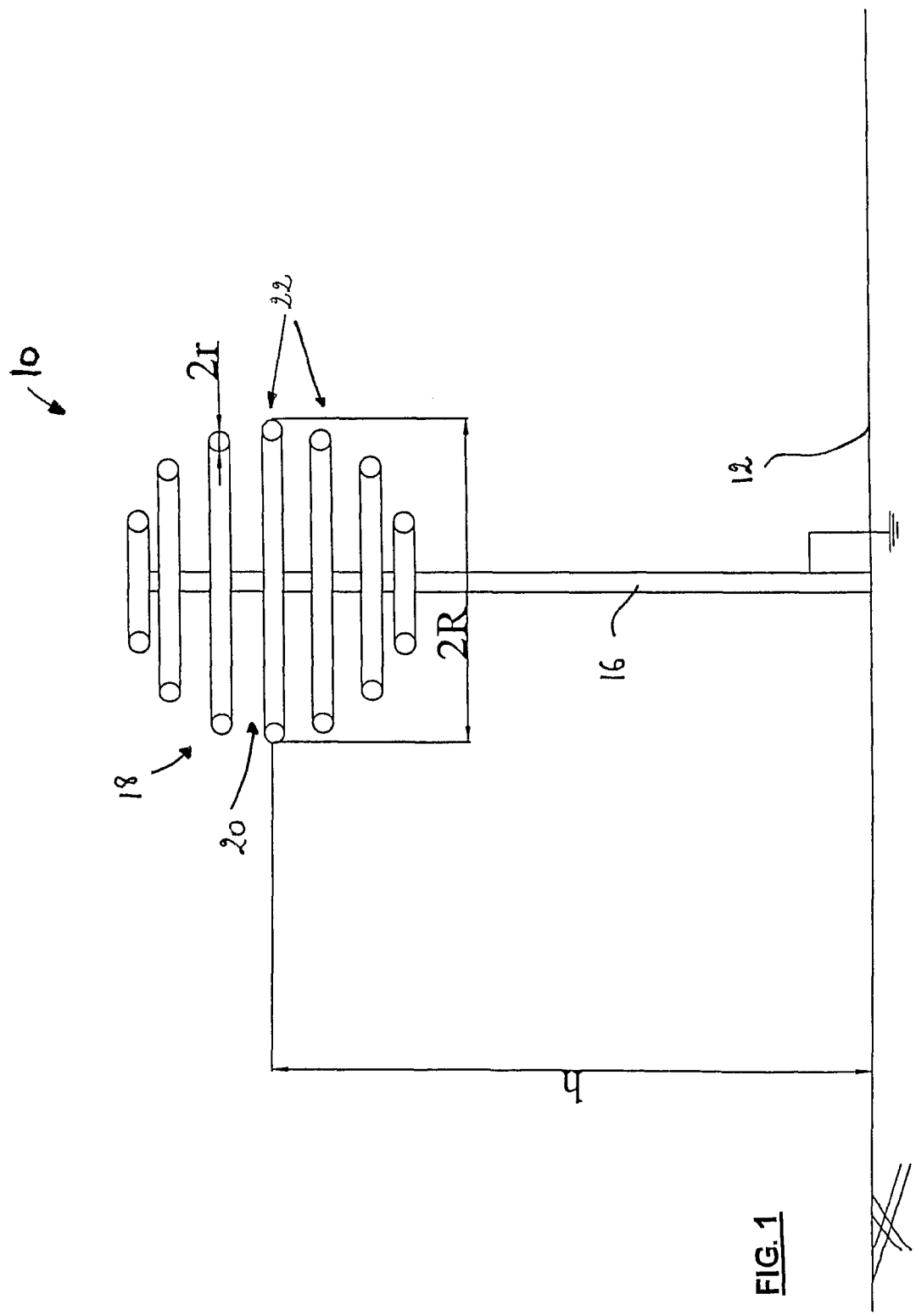
FIG. 1 is a side view of a lightning protection device installed on the ground, according to a preferred embodiment of the present invention.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to lighten the figures, some elements are not referred to in some figures if they were already identified in a precedent figure.

The present invention is concerned with a lightning protection device, also called an air terminal, that satisfies the following conditions deemed necessary to characterize an optimal design.

1. The air terminal, at any location, does not go into corona due to exposure to space potential caused by any practical value of the ambient ground field, preceding stepped leader descent. As will be shown below, this requirement can be fulfilled for effective heights h above ground plane or above a massive grounded structure not exceeding a certain limit $h_o$. This requirement will guarantee that the positive upward leader inception will be independent of the slow varying ambient field and will therefore guard against any tendency of the air terminal to self-protect.

2. For effective air terminal heights exceeding the limit established above, it will be required that the corona inception voltage of the air terminal electrode coincides with the leader inception voltage, due to space potential, at the terminal location above ground plane or above a grounded structure. This requirement will guarantee no corona space charge production which would otherwise cause the lightning protection device to self-protect against lightning strikes and limit its attractive distance.

3. The lightning protection device shall be substantially insensitive to water drops due to rain and to other protrusions due to contamination which tend to seriously reduce the corona inception field on large smooth electrodes. This requirement is important since lightning is normally associated with rain and small conducting protrusions can not be avoided under practical field conditions.

The effective height will be determined as follows:

1. For an air terminal above flat ground plane, the effective height h will be the physical height of the terminal.

2. For an air terminal atop a slender structure above flat ground plane, the effective h will be the sum of the physical lengths of the air terminal and the slender structure.

3. For a massive structure whose ceiling dimensions are much larger than the air terminal length, the effective height will be the physical length of the air terminal as in (1) above.

4. For topologies not included in the above, the effective heights for calculating the space potential at maximum ambient ground field and leader inception space potential are determined by field calculations. These calculations are described in "Modeling of Lightning Incidence to Tall Structures Part I: Theory", Farouk A. M. Rizk, IEEE Trans. on Power Delivery, Vol. 9, No. 1 January. 1994, pp. 162-171 and also in "Switching Impulse Strength of Air Insulation: Leader Inception Criterion", Farouk A. M Rizk, IEEE Trans. On power Delivery, Vol. 4. No. 4, October 1989, pp. 2187-2195.

Figure 2:
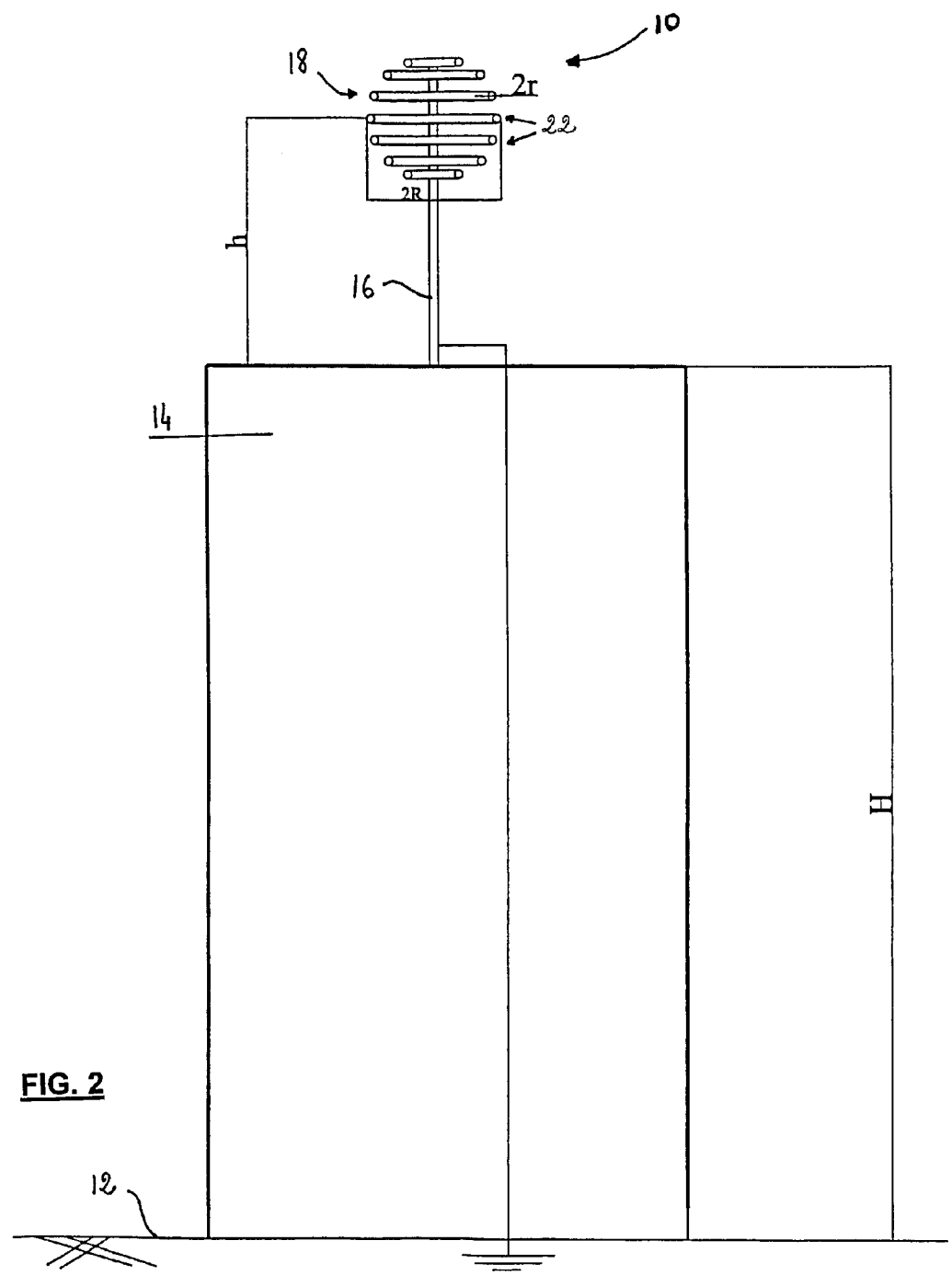
FIG. 2 is a side view of a lightning protection device mounted on the top of a structure to be protected, according to another preferred embodiment of the present invention.
Figure 3:
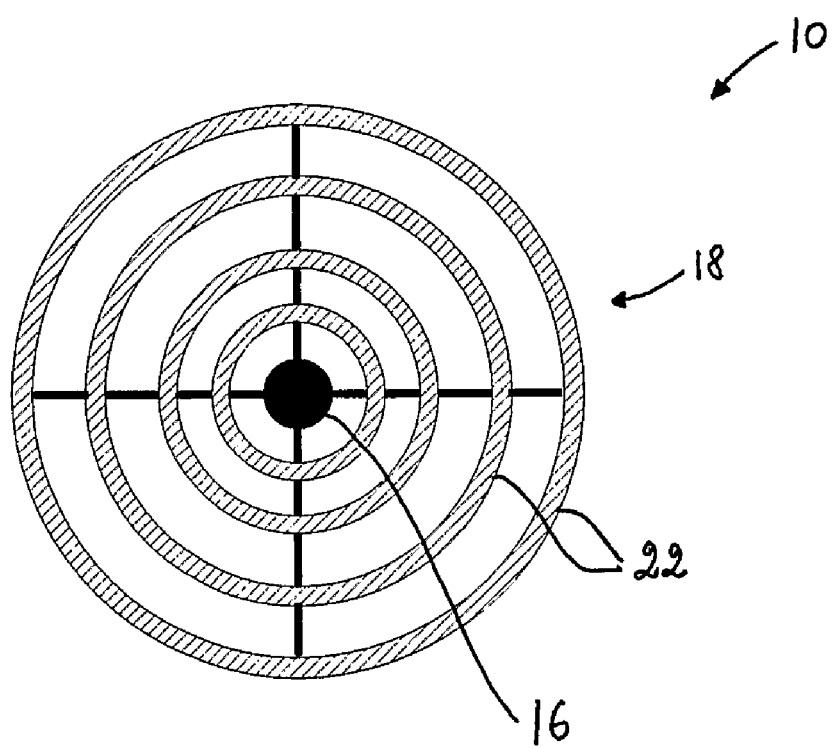
FIG. 3 is a top view of the lightning protection device shown in FIGS. 1 and 2.

Referring now to FIGS. 1 to 3, there is shown a lightning protection device 10 according to the general principles of the present invention. In FIG. 1, the lightning protection device 10 is mounted on the ground 12 while in FIG. 2 it is mounted on the top of a structure 14 to be protected. As illustrated, the lightning protection device 10 according to the present invention is provided with a grounded Franklin rod 16 and a conductive device 18 attached to the rod 16 and defining a predetermined overall shape 20 of a predetermined size therearound. As it will be more clearly understood upon reading of the present description, the conductive device 18 is particularly shaped and sized so that, for a given position above ground where a continuous upward leader inception space potential is below a maximum ambient ground field space potential, a corona inception space potential of the protection device coincides with the continuous upward leader inception space potential, under both dry and wet conditions, while, for another given position above ground where the continuous leader inception space potential exceeds the maximum ambient ground field space potential, the corona inception space potential of the protection device is above the maximum ambient ground field space potential and below the continuous upward leader inception space potential. Advantageously, the corona inception space potential of the device is substantially insensitive to surface protrusions due to contamination from pollution, vermin, insects and water droplets for example.

Of course, the conventional downward conductors and grounding system remain unchanged as to satisfy the requirements of NFPA Standard 780.

In the illustrated preferred embodiments, the conductive device 18 is advantageously provided with a plurality of metallic toroids 22 suitably spaced along the rod 16, each being electrically bonded to and around the Franklin rod 16, preferably individually to each others. As shown, each toroid 22 has a predetermined major diameter, which corresponds to an overall radius, and is arranged for defining the overall shape 20 as a spherical shape around the Franklin rod 16. In an alternative embodiment which is not illustrated, it could also be envisaged to mount the toroids 22 so as to form an ellipsoidal shape around the rod 16. The definitions of various parameters are as follows, with reference to FIG. 1: r is the minor radius of the toroids, R is the overall radius of the widest toroid, n is the number of toroids, an h is the height above ground of the central toroid.

The lightning protection device according to the present invention and generally described above is particularly designed to satisfy the following conditions:

Consider an air terminal of effective height h and consider that the mean value, along the terminal height or length, of the maximum ambient field amounts to $E_{gm}$. The corresponding maximum space potential produced by the slow ambient ground fields would be:

$$U_{gm} = E_{gm} \cdot h \quad (1)$$

A typical value of $E_{gm}$ for an air terminal of moderate height above a flat ground plane would be 20 kV/m, as shown by G. Simpson in "Atmospheric Electricity During Disturbed Weather", Geophysics Memoirs, Meteorological Office, London, No. 84, 1949, pp 1-51. Moreover, as detailed in "A Model for Switching Impulse Leader Inception and Breakdown of Long Air-Gaps", Farouk A. M. Rizk, IEEE Trans. on Power Delivery, Vol. 4, No. 1, January 1989, pp. 596-606, and also in "Switching Impulse Strength of Air Insulation: Leader Inception Criterion", Farouk A. M Rizk, IEEE Trans. On power Delivery, Vol. 4. No. 4, October 1989, pp. 2187-2195, for an air terminal with an effective height h above ground, the positive continuous leader inception space potential can be expressed as:

$$U_{lc} = \frac{1556}{1 + \frac{3.89}{h}} \quad (2)$$

(kV, m)

To determine the limiting effective height referred to above, we equate (1), (2):

$$E_{gm} \cdot h_0 = \frac{1556}{1 + \frac{3.89}{h_0}} \quad (3)$$

which results in:

$$h_o = 1556/E_{gm} - 3.89 (m, kV/m) \quad (4)$$

In general $E_{gm}$ depends on the topology of the surroundings. As described above, for a lightning rod installed on flat ground, $E_{gm}$ can be taken as 20 kV/m, thereby yielding $h_o$ of 74 m for this particular case.

It follows that for $h < h_o$, the maximum space potential $U_{gm}$ due to the ambient ground field will be lower than the positive continuous leader inception space potential U. In this effective height range any tendency of the air terminal to self-protect will be prevented if at a space potential $U_{gm}$, the electric field at any point on the air terminal surface is equal or below the corona inception field $E_{ci}$. For any value of the space potential, i.e. ambient ground field and air terminal height, the electric field at any point on the air terminal surface can be determined by a numerical field calculation technique, e.g. charge simulation, as disclosed by H. Singer, H. Steinbigler and P. Weiss in "A Charge Simulation Method for the Calculation of High Voltage Fields", IEEE Transactions, Vol. PAS-93, No. 5, September/October 1974, pp 1660-1668. The geometric parameters r, R and n of the preferred arrangement of the conductive device described above shall be selected so that the maximum applied field, at $U_{gm}$, is equated to the corona inception field $E_{ci}$ expressed by L. Thione in "The Electric Strength of Air Gap Insulation", in "Surges in High Voltage Networks", Edited by K. Ragallar, 1979, pp 165-205:

$$E_{ci}(r) = 2300\left[1 + \frac{0.224}{(2r)^{0.37}}\right] \quad (5)$$

(kV/m, m)

Where r is the minor radius of the toroids of the conductive device. It should be noted that a slight reduction of $E_{ci}$ due to surface roughness can be indirectly accounted for in the selection of $E_{gm}$ above.

For an air terminal above flat ground with h>ho, the space potential corresponding to the continuous leader inception voltage as expressed by (2) will be practically constant at approximately 1500 kV. In that range of heights, the parameters r, R and n of the preferred conductive device described above shall be selected such that at this space potential, the resulting field will satisfy the corona inception field $E_{ci}$ of (5) above.

Preferably, in practice, only a limited number of air terminal dimensions will be used which cover steps of design space potentials e.g. below 200 kV, from 200 kV to 400 kV, from 400 kV to 600 kV etc.

For practical heights of the air terminal electrode evaluation of (1) and (2) above shows that, depending on the effective terminal height, the designing space potentials vary in the approximate range 200-1500 kV. Design parameters of the terminal electrode showed that the overall radius R varies in the range 10-100 cm. The tubular conductor radius r varies in the range 0.5-2.5 cm. The number n of tubular toroids can be selected in the range of 6 to 12, suitably spaced along the spherical perimeter. The insensitivity to rain of the proposed terminal electrode shape has been confirmed by positive switching impulse tests on long air gaps, as detailed by one of the present inventors in "Influence of Rain on Switching Impulse Sparkover Voltage of Large-Electrode Air Gaps", F. A. M. Rizk, IEEE Transactions on Power Apparatus and Systems, Vol. PAS-95, No. 4, July/August 1976, pp 1394-1402. For a tubular toroidal sphere electrode with an overall radius R of 75 cm, a toroid radius r of 1.25 cm and a number of toroids n=8, the positive switching impulse 50% sparkover voltage of a 2.5 m gap under dry conditions amounted to 987 kV while under artificial rain, satisfying IEC Standard 60, it amounted to 982 kV. This shows that rain has practically no influence on the breakdown and accordingly on the positive leader inception voltage of the lightning protection device of the present invention. For the same gap with a completely covered 1 m diameter smooth spherical electrode, the corresponding breakdown voltage drops from 1481 kV under dry conditions to 897 kV under rain, as mentioned in the latter above-mentioned scientific reference.

The physical explanation of this impressive performance of the lightning protection device of the present invention in the laboratory tests is believed to be:

- The uncovered tubular toroidal sphere collects far less precipitation than a full spherical surface.
- Water droplets tend to collect at the lower surface of the toroidal tubes between successive toroids where the electric field is reduced.
- Due to the much smaller tube radius compared to that of a smooth sphere of the same diameter the field disturbances due to water droplets or contaminants becomes much less significant.

It should be mentioned that, according to the invention, any standard Franklin rod may advantageously be modified by encasing it in a set of metallic toroids of varying size and individually bonded to the rod to form the lightning protection device of the present invention.

It should also be mentioned that, in the Figures, the toroids are shown oriented horizontally, but these may be oriented in other directions, such as vertically for a non-limitative example. However, it would not work as well if the toroids were oriented vertically, in that when wet, water droplets might form on locations where the electric field would not be as reduced had the toroids been oriented horizontally, but the difference may be minor.

A person well versed in the art to which the invention pertains will easily understand that the lightning protection device according to the present invention is to be used where ever lightning rods are presently used.

Although preferred embodiments of the present invention have been described in detail herein and illustrated in the accompanying drawings, it is to be understood that the invention is not limited to these precise embodiments and that various changes and modifications may be effected therein without departing from the scope of the present invention.

The invention claimed is:

1. A lightning protection device comprising:
   a grounded Franklin rod; and
   a conductive device electrically bonded to the rod and defining a predetermined overall shape of a predetermined size therearound, the conductive device being shaped and sized to provide a better lightning rod by eliminating a production of ions or space charges, to limit an amount of corona discharges before lightning strikes so that, for a given position above ground where a continuous upward leader inception space potential is below a maximum ambient ground field space potential, a corona inception space potential of the protection device coincides with the continuous upward leader inception space potential, under both dry and wet conditions, while, for another given position above ground where the continuous leader inception space potential exceeds the maximum ambient ground field space potential, the corona inception space potential of the protection device is above the maximum ambient ground field space potential and below the continuous upward leader inception space potential, the corona inception space potential of the protection device being substantially insensitive to surface protrusions due to contamination.

2. The lightning protection device according to claim 1, wherein said conductive device comprises a plurality of metallic toroids spaced along the rod, each being bonded to the Franklin rod.

3. The lightning protection device according to claim 2, wherein each of said toroids has a predetermined major diameter and a predetermined minor diameter and is arranged for defining the overall shape as a spherical shape.

4. The lightning protection device according to claim 2, wherein each of said toroids has a predetermined major diameter and a predetermined minor diameter and is arranged for defining the overall shape as an ellipsoidal shape.

5. The lightning protection device according to claim 2, wherein said Franklin rod extends substantially vertically and each of said toroids extends substantially horizontally around the rod.

* * * * *